July 27, 1965    W. R. SIMMONS    3,196,662
PULLING HEAD DEVICE FOR THE STEM OF FASTENERS
Filed July 31, 1963    3 Sheets-Sheet 1

INVENTOR.
WALTER RUSSELL SIMMONS
BY George B. White
ATTORNEY

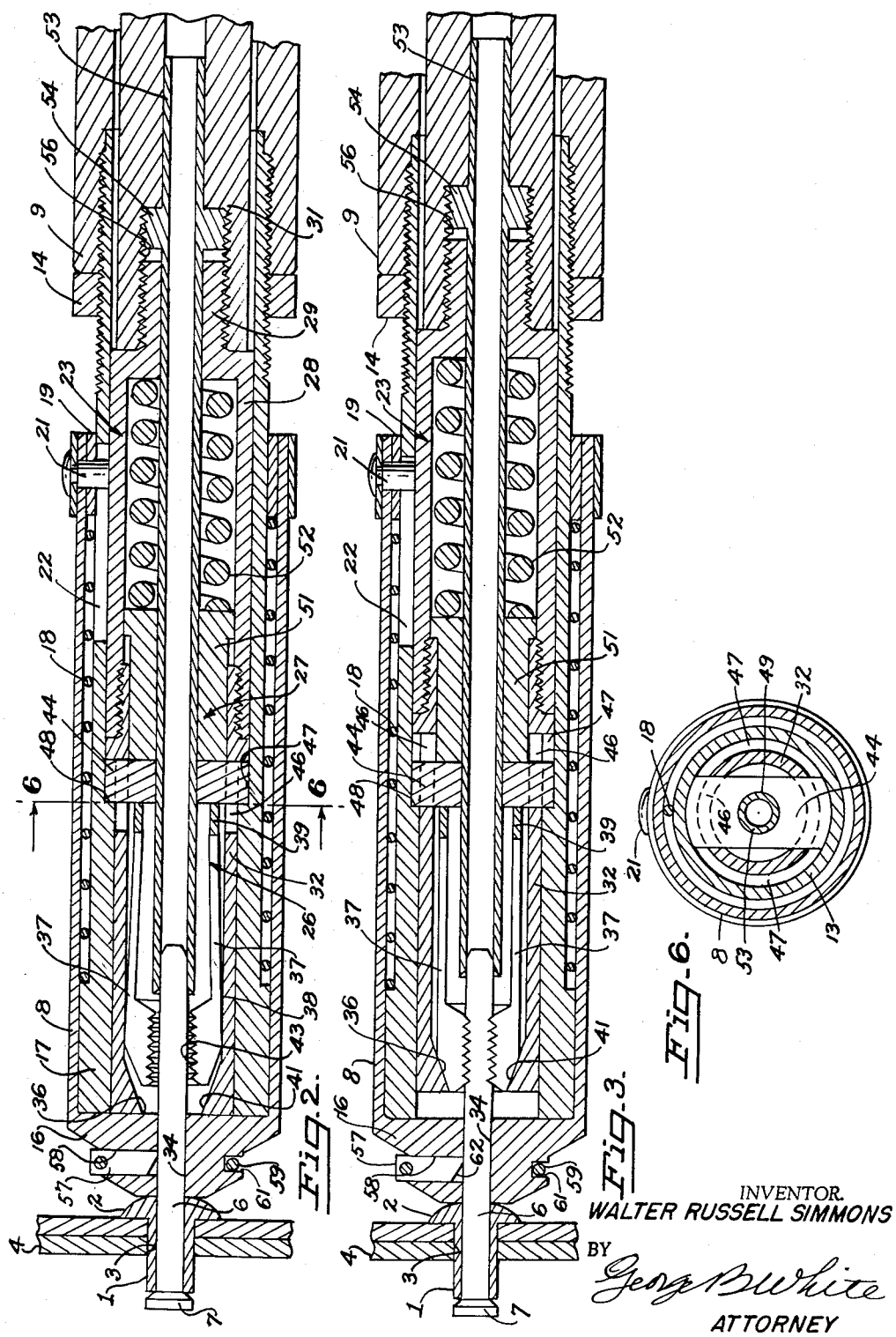

July 27, 1965 W. R. SIMMONS 3,196,662
PULLING HEAD DEVICE FOR THE STEM OF FASTENERS
Filed July 31, 1963 3 Sheets-Sheet 3
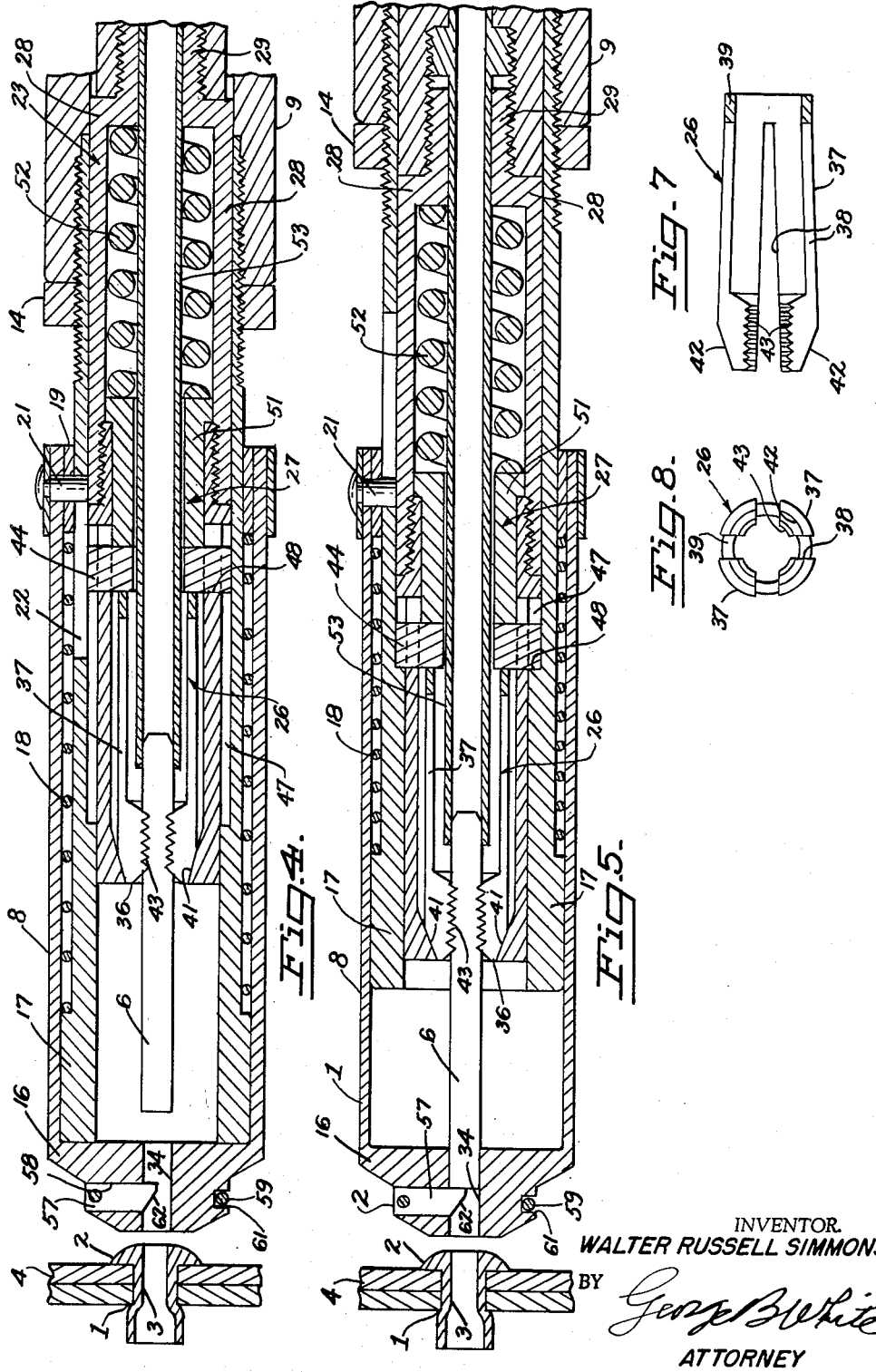
INVENTOR.
WALTER RUSSELL SIMMONS
BY
ATTORNEY

United States Patent Office 3,196,662
Patented July 27, 1965

3,196,662
PULLING HEAD DEVICE FOR THE STEM OF FASTENERS
Walter R. Simmons, Buena Park, Calif., assignor to Textron Industries, Inc., a corporation of Delaware
Filed July 31, 1963, Ser. No. 298,930
7 Claims. (Cl. 72—391)

This invention relates to a pulling head device for the stem of fasteners, such as blind rivets or the like where a stem is pulled for setting the fastener, which stem breaks after the setting.

Such pulling head devices are usually secured to power tools suitable to exert a pressure while the stem is pulled. Thus such pulling head devices have a part to exert pressure to hold the fastener in place, for instance pressure against the head of a blind rivet, and have another part, namely a drawbolt, whereby the stem is pulled to clinch and set the fastener and which on further pulling breaks off the portion of the stem pulled through the fastener. In such drawbolt usually there is a jaw device for gripping the stem, which jaw device previously had jaw segments which were forced into a tapered collet with comparatively light spring pressure which did not provide sufficient grip for the stronger pulling forces frequently demanded. Another problem is jaw clogging. This causes excessive slipping of the jaws on the stem which in turn causes more jaw clogging and ultimately complete failure of operation.

The advantages of the present invention are the capability of the herein disclosed device to exert stronger preliminary force on the jaws to close them more tightly on the stem prior to the actual stem pulling operation; the intensification of the grip during the pulling operation; accomplishing higher preloading of the jaws; elimination of slipping of the stem in the jaws; thereby preventing the clogging of the jaws.

Further advantage of the herein invention is that the broken stem does not have to be forced through spring loaded jaws hence there is no scraping off of stem material into the jaw segments and thus the loading up of the jaws is prevented and efficient gripping operation is assured. In the invention herein the drawbolt is returned completely back to its original or starting position where the jaws completely are relieved of pressure and where a comparatively light force can gently force the stem out of the jaws and propel the stem out through an ejector tube, thus can ready the device for the next stem pulling operation.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 2 is a sectional view of the pulling head device in the initial or stem receiving position.

FIG. 3 is a sectional view of the pulling head device in the initial stem gripping position.

FIG. 4 is a sectional view of the pulling head device in position after the rivet is set and stem is broken.

FIG. 5 is a sectional view of the pulling head device in position where the drawbolt is returned toward its initial position with the broken stem in position for ejection.

FIG. 6 is a cross-sectional view, the section being taken on lines 6—6 of FIG. 1.

FIG. 7 is a sectional detail view of the jaw device.

FIG. 8 is an end view of the jaw device.

Figure 1:
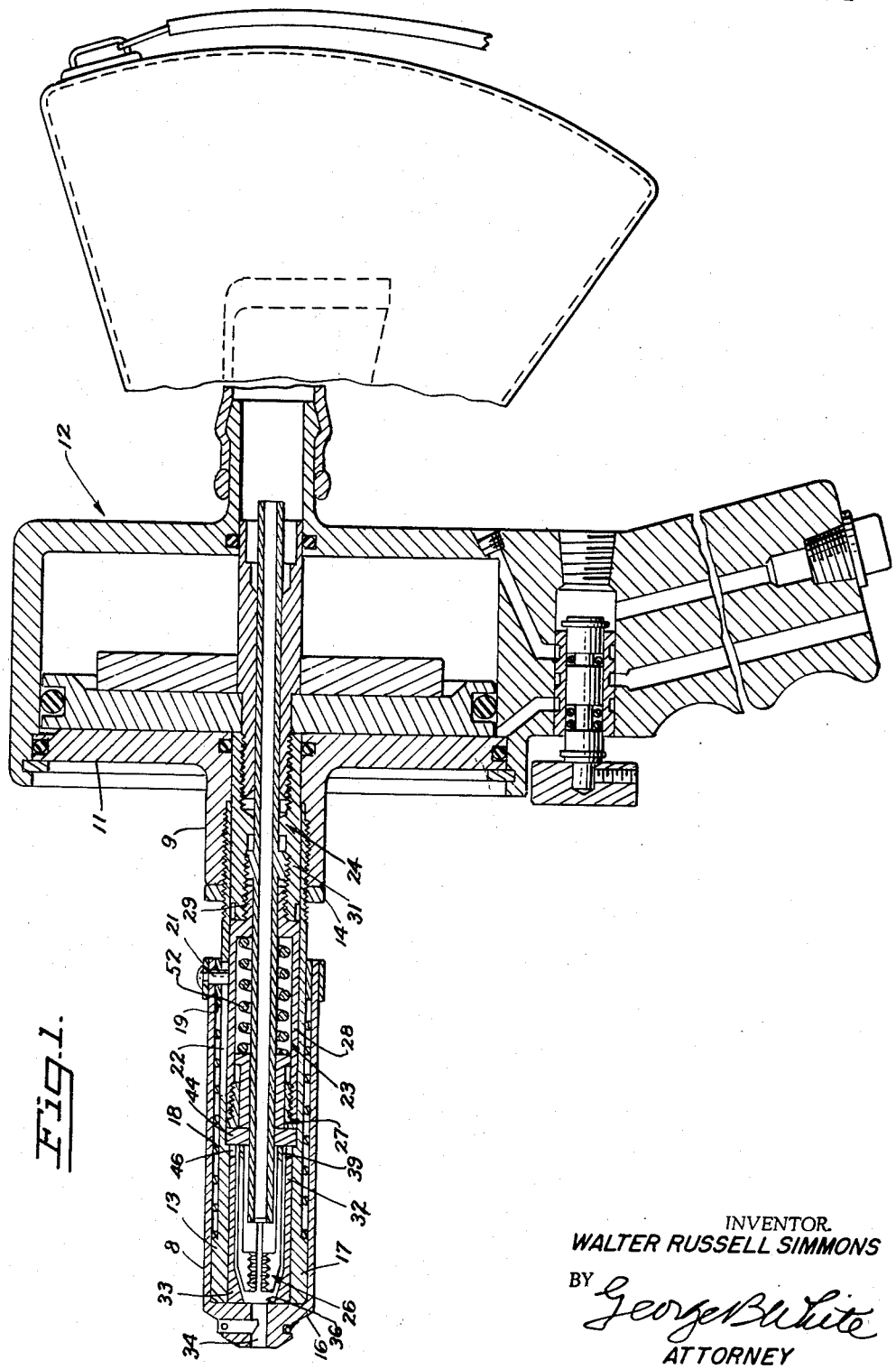
FIG. 1 is a partly sectional view of the pulling head device on a pneumatic power tool or gun.

In the illustrative embodiment of the invention herein a blind rivet 1 with a rivet head 2 is inserted through holes 3 of sheets 4. A stem 6 extends through the rivet 1. A former head 7 on the stem engages the blind end of the rivet 1 so that when the stem 6 is pulled while the rivet head 2 is held against the work a blind head is formed on the blind end of the rivet 1 as shown in FIGS. 4 and 5.

The pulling head device herein is particularly useful in improving the operation of setting blind rivets having smooth stems but it could also improve the setting operation of other fasteners, such as lockbolts or the like, wherein the pulling of the stem or the like part is essential for the setting of the fastener.

The pulling head device herein has a sleeve 8 which is supported on a pressure member or tool nose 9 of the cylinder or nose plate 11 of a power tool 12. The support in this illustration is by means of a tubular liner 13 which is threaded into the power tool nose 9 and secured by a jam nut 14.

The sleeve 8 has a sleeve nose 16 adapted to press upon the rivet head 2. The liner 13 has a head 17 of larger diameter at its forward end and the sleeve 8 fits slidably over said liner head 17. Around the reduced portion of the liner 13 is a coil spring 18 which bears against the liner head 17 at one end and at its other end against a spring retainer ring 19, which latter is secured to the tail end of the sleeve 8 by a guide pin 21. An elongated guide slot 22 in the sleeve 8 guides the guide pin 21 but does not limit its stroke so that it permits desirable compression and complete expansion of the coil spring 18 and complete return of the sleeve nose 16 against the sleeve head 17.

A drawbolt 23 reciprocates in the liner 13. The drawbolt is connected to the piston assembly 24 of the power tool 12. In the drawbolt 23 are a jaw device 26 and jaw pusher means 27 for firmly gripping and pulling the stem 6, as the drawbolt 23 is pulled by the piston assembly 24 of the power tool 12.

The drawbolt is made in two sections. A base section 28 of the drawbolt has a threaded boss 29 screwed into the piston shaft 31 of the piston assembly 24. A tubular jaw holder 32 is threadedly secured into the open end of the base section 28. In the initial or starting position the forward end of the jaw holder 32 abuts against the inside face of the sleeve nose 16. The sleeve nose 16 and the adjacent forward end 33 of the jaw holder 32 have axially registering apertures 34 and 36 respectively for the insertion of the stem 6 therethrough.

The jaw device 26 is constructed from one piece of tubular material one end of which is slotted, so as to form a plurality, in this illustration four, jaw segments 37 separated by the slots 38, and a tubular jaw base 39. These segments 37 are spread apart during the heat treatment of the jaw device so that normally the jaw segments 37 are sprung open or spring biased outwardly into open position. The overall outside diameter to which the jaw segments 37 are spread is slightly larger than the inside diameter of the jaw holder 32 of the drawbolt 23 so that the segments 37 are slightly compressed by and ride on the inside surface of the jaw holder 32.

The inside of the tip or forward end of the jaw holder 32 is formed into a generally frusto-conical socket 41 tapering or converging toward the aperture 36 in the tip of the jaw holder 32. Each jaw segment 32 has a jaw 42 formed thereon with teeth 43 on its inside face. The outer side of each jaw 42 is tapered toward the free ends of the jaw segments 32 converging generally frusto-conically at a somewhat smaller inclined angle with the axis of the jaw device than the angle of convergence of the frusto-conical socket 41. The axis of the jaw device is in registry with the apertures 34 and 36 so as to receive the inserted stem 6 centrally between the jaws 42. Thus when the jaw device is pushed forward so that the jaws 42 are pressed into the frusto-conical socket 41, then teeth 43 of the jaws 42 bite into and grip the stem 6 firmly. When the jaw device is moved away and released from said frusto-conical socket 41 the jaw segments 32 spring apart and release the then broken stem 6.

The jaw pusher means 27 include a pusher block 44 which extends though elongated slots 46 in the jaw holder 32 of the drawbolt 23 into the enlarged bore 47 of the liner 13. The base section 28 of the drawbolt 23 is of correspondingly larger outer diameter than the outer diameter of the jaw holder 32 so as to fit the respective bores of liner 13. The shoulder 48 in the liner 13 serves to limit the forward stroke of the pusher block 44 in the initial position shown in FIG. 2 so as to keep the jaw segments 37 open for insertion of the stem 6. The pusher block 44 is pressed against the rear end of the elongated slots 46, in this initial position. The pusher block 44 has a hole 49 through its center. Behind the pusher block 44 is a tubular spring backup 51 slidable in the end of the jaw holder 32. A pusher coil spring 52 between the closed end of the base section 28 of the drawbolt 23 and the backup 51 pushes the backup 51 and thus pushes the pusher block 44 against the jaw base 39. Thus when the drawbolt 23 is pulled away from the sleeve nose 16 the pusher block 44 is permitted to move in the elongated slots 46 to push the jaw device 26 into jaw closing position as shown in FIG. 3. The preloading of the pusher spring 52 accelerates and improves the gripping action of the jaws.

An ejector tube 53 extends axially from the jaw device 26 through the pusher block 44, the backup 51 and drawbolt boss 29 into the piston assembly 24 of the puller device, which latter has suitable means to guide and collect the ejected broken stems. The ejector tube has a threaded collar 54 thereon threaded into the bottom of the threaded pocket 56 in the piston shaft 31 to hold the ejector tube 53 in proper registering position.

The ejector device includes an obstruction pin 57 movable in a transverse hole 58 intersecting the nose aperture 34. A spring ring 59 nesting partly in a peripheral groove 61 of the sleeve nose 18, extends through the obstruction pin 57 so as to urge the pin 57 inwardly across the aperture 34 into stem obstructing position. The end 62 of the pin 57 is tapered outwardly and away from the aperture 34 and toward the tip end of the sleeve nose 16 so that when the stem 16 is inserted from the outside it pushes the pin 57 out of the aperture 34. But the broken stem abuts against the pin 57, as shown in FIG. 5 and is obstructed thereby.

In operation the stem 6 is inserted through the nose aperture 34 into the jaw device 26 and into the end of the ejector tube 53. As the piston assembly 24 of the power tool 12 pulls the drawbolt away from the sleeve nose 16 the pusher block 44 is pushed forward in the drawbolt slots 46 and the preloaded pusher spring 52 forces the jaw device and the jaw segments 37 so as to press the jaws 42 into the frusto-conical socket 41 thereby to grip the stem 6, as shown in FIG. 3. By further pulling drawbolt 23 and the stem 6 relatively to the liner 3 and the sleeve nose 16, the rivet is set and after the setting of the rivet the portion of the stem 6 projecting into the pulling head breaks off, as shown in FIG. 4. The drawbolt 32 is then returned to the initial position by the piston assembly 24, but the broken stem 6 abuts against the obstruction pin 57 and pushes the sleeve nose 16 and the sleeve 8 away from and off the liner 3 thus compressing and loading the sleeve spring 18, as shown in FIG. 5. The sleeve spring 18 is comparatively light, namely of considerably lighter tension than that of the pusher spring 52. As the drawbolt 23 is moved further from the position shown in FIG. 5 to the initial position shown in FIG. 1 the pusher block 44 is forced back in the elongated slots 46 to preload the pusher spring 52 and thus relieves the pressure on the jaw device 26. The very slight pressure exerted by the sleeve spring 18 on the broken stem 6 suffices to push the relieved jaw device 26 away from the frusto-conical socket 41 and loosen the jaws 42 and to propel the broken stem 6 further into the ejector tube 53 for ejection, simultaneously returning the sleeve 8 to its initial position shown in FIG. 1 ready for the next setting operation.

I claim:

1. Pulling head device for pulling a stem slidable through a fastener member for setting the fastener member, comprising
   (a) a sleeve
   (b) a nose on the sleeve for exerting pressure on the fastener while the stem is pulled
   (c) means to connect said sleeve to the pressure member of a power tool
   (d) a tubular drawbolt reciprocable away from said nose for pulling said stem and movable toward said nose into an initial position for receiving said stem
   (e) said nose and the adjacent end of said drawbolt having axially aligned apertures for the insertion of said stem
   (f) a stem gripping jaw device in said drawbolt axially aligned with said apertures to receive said stem
   (g) means in said drawbolt to close said jaw device grippingly on said stem when said drawbolt is pulled relatively to said sleeve
   (h) spring means normally to urge said jaw device to said jaw closing means
   (i) and means to limit the action of said urging means in stem receiving position of said drawbolt relatively to said jaw closing means to prevent the closing of said jaw device in said stem receiving position and to preload said spring means
   (j) a jaw pusher movable in said drawbolt, said jaw device being between said jaw pusher and said adjacent end of said drawbolt
   (k) said spring means in said drawbolt urging said jaw pusher toward said adjacent end and against said jaw device
   (l) said drawbolt having an elongated slot through at least a side thereof, and said jaw pusher projecting through said slot to the outside of said drawbolt
   (m) a fixed abutment in the path of said jaw pusher abutted by said jaw pusher in the stem receiving position of said jaw device, said elongated slot extending beyond said abutment toward said adjacent end whereby the force of said pusher member is applied for pressing said jaw device to said jaw closing means when the pulling of said drawbolt frees said jaw pusher from said abutment.

2. Pulling head device for pulling a stem slidable through a fastener member for setting the fastener member, comprising
   (a) a sleeve
   (b) a nose on the sleeve for exerting pressure on the fastener while the stem is pulled
   (c) means to connect said sleeve to the pressure member of a power tool
   (d) a tubular drawbolt reciprocable away from said note for pulling said stem and movable toward said nose into an initial position for receiving said stem
   (e) said nose and the adjacent end of said drawbolt having axially aligned apertures for the insertion of said stem (f) a stem gripping jaw device in said drawbolt axially aligned with said apertures to receive said stem (g) means in said drawbolt to close said jaw device grippingly on said stem when said drawbolt is pulled relatively to said sleeve (h) spring means normally to urge said jaw device to said jaw closing means (i) and means to limit the action of said urging means in stem receiving position of said drawbolt relatively to said jaw closing means to prevent the closing of said jaw device in said stem receiving position and to preload said spring means (j) a jaw pusher movable in said drawbolt, said jaw device being between said jaw pusher and said adjacent end of said drawbolt (k) said spring means in said drawbolt urging said jaw pusher toward said adjacent end and against said jaw device (l) a tubular liner between said sleeve and said drawbolt fixed relatively to said drawbolt (m) said drawbolt having an elongated slot therethrough (n) said jaw pusher projecting through said drawbolt slot into said liner (o) an abutment in said liner to limit the jaw pusher movement toward said adjacent end in the stem receiving position of said drawbolt, (p) said jaw pusher being freed from said abutment by the pulling of the drawbolt so as to move in said elongated slot for pushing said jaw device to said closing means and holding said jaw device in stem gripping position as said drawbolt pulls said stem.

3. In a pulling head device for pulling a stem slidable through a fastener member for setting said fastener member, (a) a sleeve (b) a nose on the sleeve for exerting pressure on the fastener while said stem is pulled (c) a tubular liner in said sleeve attachable to the pressure member of a power tool (d) a tubular drawbolt reciprocable in said liner and attachable to the pulling member of said pressure tool (e) said nose and said drawbolt having axially registering apertures for the insertion of said stem therethrough (f) a jaw device in said drawbolt for receiving and gripping the inserted stem (g) compressible means normally to urge and hold said jaw device in an initial open position for the insertion of said stem (h) means coordinated with the pulling of said drawbolt to close said jaw device for gripping the inserted stem (i) an ejector tube extended axially through said drawbolt and said jaw device for receiving the end of said stem when inserted into said jaw device (j) said sleeve being slidable on said liner (k) resiliently yieldable means to hold said sleeve in position on said liner with said sleeve nose in initial stem receiving position to said drawbolt (l) an obstruction in said aperture of said sleeve nose withdrawable by the insertion of said stem from the outside but obstructing the broken stem left in said jaw device when said drawbolt is returned to initial position so that said broken stem pushes said sleeve nose away from said liner thereby preloading said resiliently yieldable sleeve holding means, whereby said broken stem is propelled through said ejector tube when released by said jaw device in said initial position.

4. The pulling head device defined in claim 3, wherein said resiliently yieldable means comprises (m) an abutment on said liner (n) a coil spring around said liner bearing against said abutment and against said sleeve so as to pull said sleeve nose against said liner.

5. The pulling head defined in claim 4, and (o) said coil spring being of lighter tension than the tension of said compressible jaw device holder means.

6. The pulling head device defined in claim 3, said obstruction in said nose aperture comprising (m) an element in said nose slidably transversely across said aperture (n) a spring urging said element across said aperture (o) said element being tapered on one side at an angle to be pushed out of the way by the stem inserted into said nose aperture from the outside, but resisting the entry of a broken stem from the inside of said nose.

7. Pulling head device for pulling the stem of a blind rivet and the like, having a head thereon comprising (a) sleeve (b) a nose on the sleeve for pressing on the rivet head (c) a tubular liner in the sleeve adapted to be secured to a power tool (d) a tubular drawbolt reciprocable in the liner and adapted to be secured to a pulling part of a power tool (e) the tip of said drawbolt initially bearing against the inside of said sleeve nose (f) a stem gripping jaw in said drawbolt (g) a plurality of jaw segments in said jaw normally resiliently sprung away from each other and gripping said stem when pressed together (h) the tips of said jaw members being tapered toward the tip of said drawbolt (i) said sleeve nose and said drawbolt tip having stem receiving apertures registering with the space between said jaw segments (j) the interior of the tip of said drawbolt being tapered for pressing the tapered tips of said jaw segments together for gripping the rivet stem when drawn over said jaw segments (k) a jaw pusher spaced from the tip of and reciprocable in said drawbolt and bearing against said jaw (l) a backup in said drawbolt bearing against said jaw pusher (m) a coil spring in said drawbolt bearing against the fastened end of the drawbolt and against said backup to push said jaw into the drawbolt tip (n) said tubular liner having longitudinal guide space along its inner periphery (o) said drawbolt having slots through its sides, said jaw pusher projecting through said slots into said guide space (p) abutment means in said guide space limiting the movement of said jaw pusher toward said drawbolt tip in the initial position of said jaw spaced from said tapered drawbolt tip whereby said coil spring is preloaded and when said drawbolt is pulled away from said sleeve nose relatively to said liner said jaw pusher is pressed by said preloaded spring against said jaw thereby to press the tips of said jaw segments into the tapered tip of said liner for gripping and pulling said stem (q) an ejector tube fixedly held in said drawbolt and extended into said jaw between said segments slidably to receive the stem gripped in said jaw (r) a guide slot along the exterior of said liner (s) a guide pin on said sleeve movable in said guide slot (t) a shoulder on the exterior of said liner (u) a comparatively light coil spring around said liner bearing against said liner shoulder and against the sleeve so as to urge the sleeve nose against the tip of said liner (v) said exterior guide slot extending beyond the extreme positions of said pin during the strokes of movement of said sleeve (w) a stop pin held transversely slidably in said sleeve nose
(x) a spring ring around said nose extended through said stop pin to urge said stop pin into the aperture through said sleeve nose for obstructing the broken stem in said jaw, thereby to push said sleeve off said liner when said drawbolt with said broken stem is returned to the initial position and to compress said light coil spring for imparting force for freeing the broken stem from the jaw segments and propelling the broken stem through said tube as said sleeve is returned to the initial position,
(y) said obstructing pin being tapered at its obstructing end at such angle as to be pushed out of said obstructing position when a stem is inserted through said sleeve nose from the outside thereof.

References Cited by the Examiner

UNITED STATES PATENTS

| | | | |
|---|---|---|---|
| 2,132,113 | 10/38 | Huck | 218—42 |
| 2,384,690 | 9/45 | Mullgardt | 218—4 |
| 3,017,052 | 1/62 | Kolec | 218—42 |

FOREIGN PATENTS 555,533  8/43  Great Britain.

GRANVILLE Y. CUSTER, Jr., *Primary Examiner.*